United States Patent [19]

Collins

[11] Patent Number: 5,054,575

[45] Date of Patent: Oct. 8, 1991

[54] DEAD AXLE SUSPENSION FOR A PAIR OF DRIVEN WHEELS INCLUDING A LATERAL GUIDE

[75] Inventor: William T. Collins, Pontiac, Mich.

[73] Assignee: DLMA Transportation, Inc., Troy, Mich.

[21] Appl. No.: 602,815

[22] Filed: Oct. 24, 1990

Related U.S. Application Data

[63] Continuation-in-part of Ser. No. 460,994, Jan. 4, 1990.

[51] Int. Cl.⁵ .............................................. B60G 9/04
[52] U.S. Cl. .................................... 180/354; 280/689; 280/726
[58] Field of Search ............... 280/688, 689, 723, 726, 280/724; 180/353, 354, 359, 360

[56] References Cited

U.S. PATENT DOCUMENTS 2,234,025  3/1941  Dellert ................................. 280/724
4,589,677  5/1986  Matschinsky ....................... 280/726

FOREIGN PATENT DOCUMENTS 519608  4/1940  United Kingdom ................ 280/724

Primary Examiner—Richard A. Bertsch
Assistant Examiner—Karin Tyson
Attorney, Agent, or Firm—Reising, Ethington, Barnard, Perry & Milton

[57] ABSTRACT

A rear suspension particularly adapted for light and medium weight trucks and buses wherein a chassis and body are supported upon a dead axle the latter of which is of a light weight and rigid construction so as to permit a lower positioning of the chassis relative to the ground and in such a way as to eliminate lateral displacement of the dead axle relative to the chassis and wherein the aft end of the roll axis of the suspension is either horizontal or displaced vertically above a horizontal line passing through the point of articulation of the suspension to the chassis to eliminate the tendency of the dead axle to oversteer the vehicle as it moves vertically relative to the chassis.

5 Claims, 6 Drawing Sheets

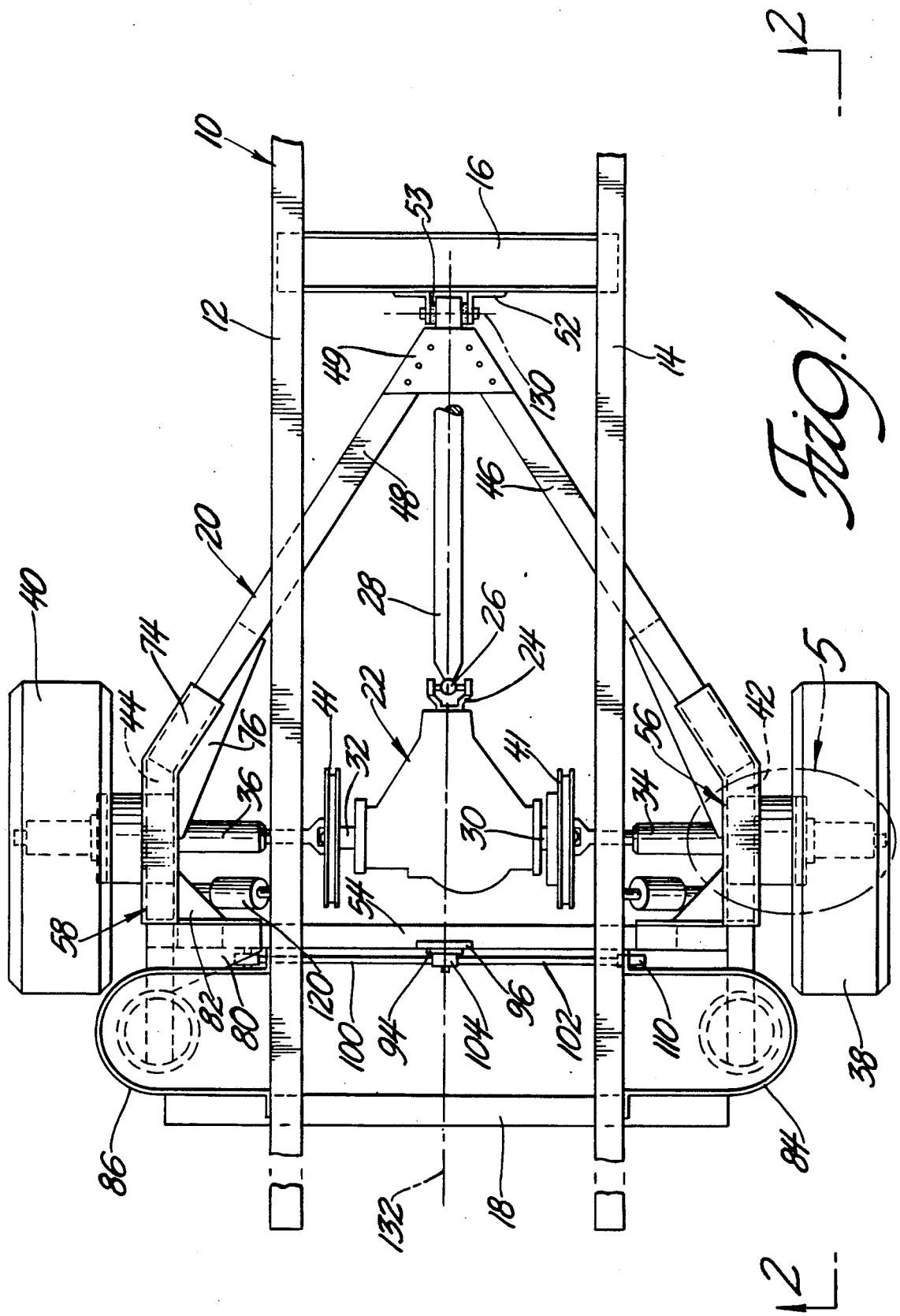

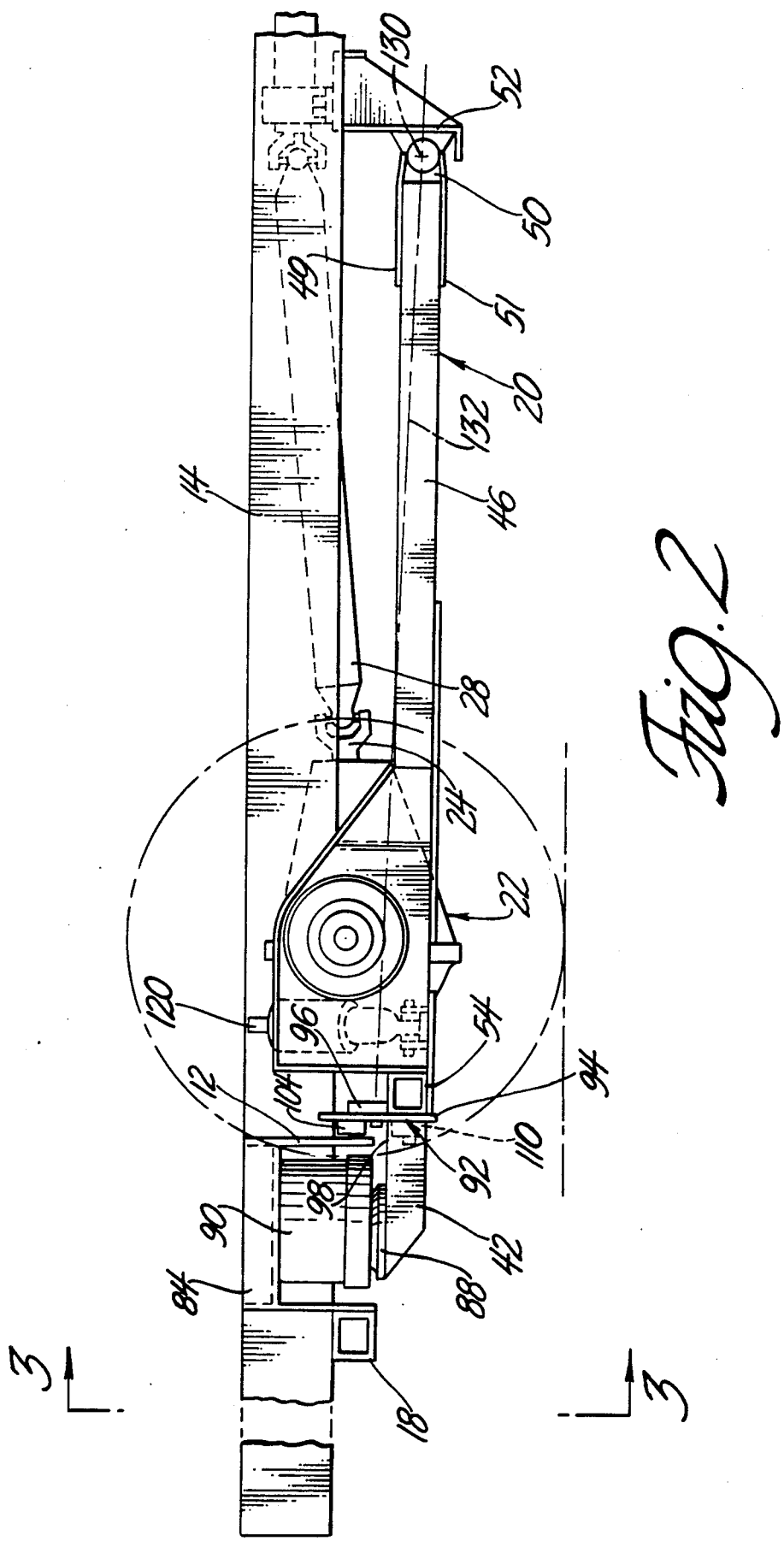

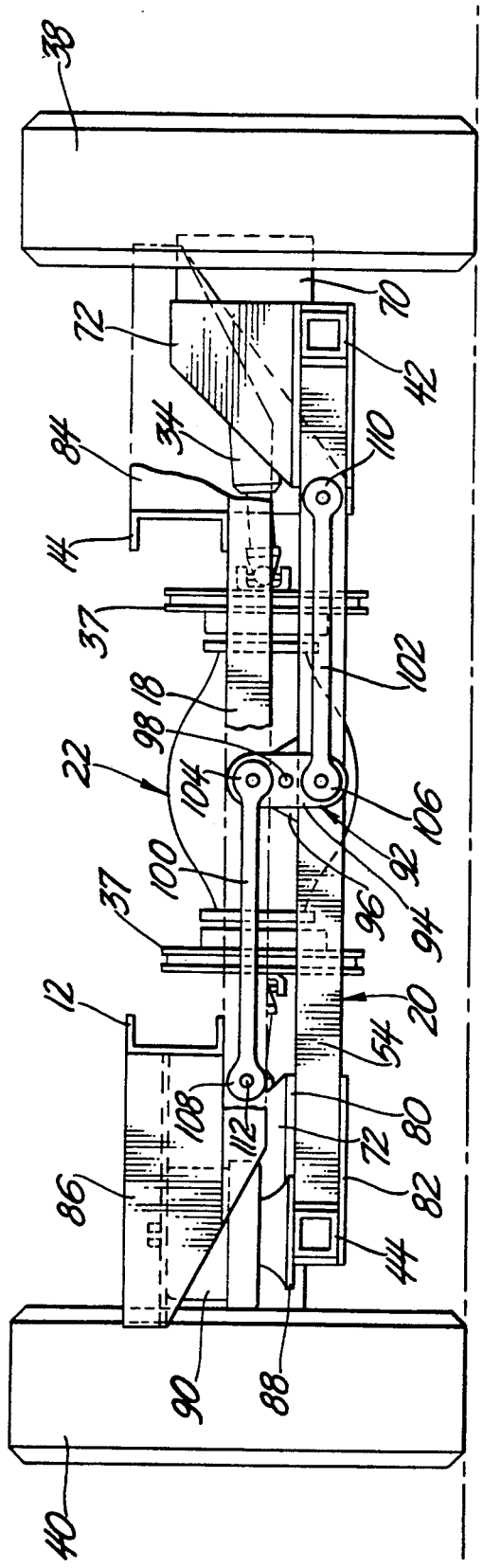

DEAD AXLE SUSPENSION FOR A PAIR OF DRIVEN WHEELS INCLUDING A LATERAL GUIDE

The present invention is a continuation-in-part of U.S. Ser. No. 460,994 Rear Suspension - Collins, filed Jan. 4, 1990.

BACKGROUND OF THE INVENTION

The present invention relates to a light weight rear suspension of a type particularly adapted to be used with light and medium trucks and buses utilizing a conventional chassis. The suspension of the subject invention is particularly adapted for use with trucks and buses wherein it has become increasingly important both to lower the floor level of the associated vehicle for easier access and to lower the center of gravity for better handling as well as to reduce the unsprung weight of the suspension thereby contributing to overall improved ride and reduced vibration of the vehicle.

The present suspension is primarily articulated to the chassis through a single forwardly disposed joint which eliminates the need for a plurality of radius rods or control rods as required by previous suspensions used in truck and bus applications. Thus, while the suspension of the present invention is intended for use with trucks and buses, it has been made in such a way as to be substantially lighter and less complicated than previous suspensions used for the same application.

While the single point articulation of applicant's type of suspension has many advantages unless the lateral movement stabilization mechanism is properly located oversteering will occur as the vehicle turns. "Oversteering" is a term applied to vehicle handling dynamics when as the lateral acceleration end roll of a vehicle in a turn increases the driver must reduce his steering input to maintain the same turning radius. "Understeer" is the opposite of Oversteer. Oversteering can be a serious problem in that it can cause the vehicle to turn more sharply than the driver anticipates. From a safety point of view it is preferable that there either be no oversteering force created by the rear suspension or that there be a slight tendency to understeer. Thus, the purpose of applicant's invention is to provide a lateral movement stabilization system for a rear suspension which either eliminates oversteering or creates a small understeering action.

PRIOR ART

Among the prior art of which applicant is aware and from which the subject invention has evolved are U.S. Pat. Nos. 4,343,375 and 4,362,221 as well as a U.S. Patent No. 4,946,189 Rear Suspension - Manning, issued Aug. 7, 1990. It is a particular objective of applicant's present suspension invention to eliminate the tendency of an unsprung sub-frame or dead axle to impart a steering action to the vehicle as the dead axle moves vertically relative to the vehicle body or chassis.

The following earlier U.S. Pat. Nos. 1,394,099 Lansden and 2,132,963 Nallinger were cited against Manning's earlier noted patents and bear a similarity to the subject invention in that they utilize a rear suspension having a single primary point of articulation to a chassis. Nallinger also provides a cam/roller mechanism between his vehicle frame and axle to resiliently resist both vertical and transverse movement of the axle relative to the vehicle frame. While the present invention has similar features to all of the foregoing prior art patents, the unique configuration and construction of the suspension of the present invention is clearly distinguishable and provides an improved suspension not shown or suggested by the prior art.

During the prosecution of the earlier application, the following U.S. patent references were brought to applicant's attention: 2,234,025 Dellert; 4,589,677 Matschinsky; and 4,802,689 Hoffmann. These references show various applications of so-called Watts linkages as applied to various vehicle suspensions. None of these references relates to the type of dead axle to which applicant applies his invention. Other than disclosing a Watts type linkage, Hoffmann has no relevance to the type of axle with which applicant is dealing nor the problem nor solution to which applicant's invention is addressed. Finally, Hoffmann does not overcome the deficiencies of the more relevant references particularly in that the reference discloses a pair of laterally spaced Watts linkages disposed parallel to the longitudinal axis of the vehicle (applicants linkages is transversely disposed or perpendicular to such axis) and mounted upon a rigid axle. Dellert and Matschinsky differ from the subject invention in the following ways: they do not relate to a dead axle in that the differential is mounted upon the axle; they do not relate to a suspension system wherein a dead axle has a single joint of articulation to the chassis (Dellert has three while Matschinsky has two joints of articulation); their central Watts links (18 and 6) are mounted upon the vehicle chassis whereas applicants central link is supported upon his dead axle; neither recognizes the problem of oversteering and, thus, provides no solution therefore; there is no discussion of suspension roll axis and its angularity as bearing on oversteering; in neither case is there any teaching that the midpoint (or axis of rotation) of the central link is to be coincident with or vertically above a horizontal line or plane through the transverse axis of the joint of articulation of the dead axle and chassis. A further lack of relevance of the Matschinsky reference is that he equates a Watts linkage with a Panhard rod which shows no recognition of the potential problem of suspension induced oversteering.

Thus none Of the references, including the Manning patent is concerned with the potentially serious problem of suspension induced oversteering nor do they provide a correction therefore.

SUMMARY OF THE INVENTION

The subject rear suspension is generally of the type referred to as a dead axle in that the suspension is adapted to support the rear driving wheels and the vehicle body through suitable spring means. However, the wheel driving axles and differential are separate from the suspension in that the differential and the axles are supported upon the vehicle body or chassis and move vertically independently of the dead axle or suspension. This relationship is also true with respect to aforenoted prior art patents. More specifically, the dead axle of the invention is depicted as of a cathedral or forwardly converging shape in that it includes a pair of parallel and longitudinally extending beam sections at the rear end thereof and a pair of integrally connected beam sections which project forwardly and inwardly to converge to an area of articulation to the chassis. Wheel supporting subassemblies or spindle mounts are fixed upon and project above the longitudinal beam sections. The spindle mounts include outwardly projecting wheel supporting sleeves which are generally transversely aligned with the live or driving axles and the differential. The dead axle also includes a transverse beam interconnecting the longitudinal beam sections rearwardly of the wheel supporting spindle mounts and forwardly of the rearward ends of the longitudinal beam sections. The longitudinal beams extend rearwardly beyond the transverse beam and are adapted to support spring means which are, in turn, adapted to support the vehicle body upon the suspension.

The improvement of the subject invention over the aforenoted Manning patent 4,946,189 and the other prior art is in providing a linkage system which eliminates or controls transverse or lateral movement of the dead axle relative to the vehicle chassis or frame. Thus, the invention eliminates any tendency of the dead axle to impart an oversteering action to the vehicle as there is relative vertical movement between the dead axle and the chassis or wherein such movement creates a slight understeering force. By utilizing two points of articulation to the frame or chassis and by creating a zero or positive angle of inclination of the suspension roll axis relative to the horizontal plane through transverse axis 130, the subject linkage mechanism eliminates the forces in the lateral control linkage which create an oversteering action or, alternatively creates a slight understeering action.

The details and means by which the advantages of the subject invention are attained will be better understood from the following description of the invention and having reference to the attached drawings wherein:

BRIEF DESCRIPTION OF THE DRAWINGS

FIG. 1 is a plan view of the suspension as articulated to a vehicle chassis;

FIG. 2 is a side elevational view along lines 2—2 of FIG. 1.

FIG. 3 is a rear end view looking forwardly along lines 3—3 of FIG. 2.

FIG. 4 is a partial perspective view showing the details of a wheel supporting subassembly or spindle mount.

BEST MODE OF THE INVENTION

Figure 5:
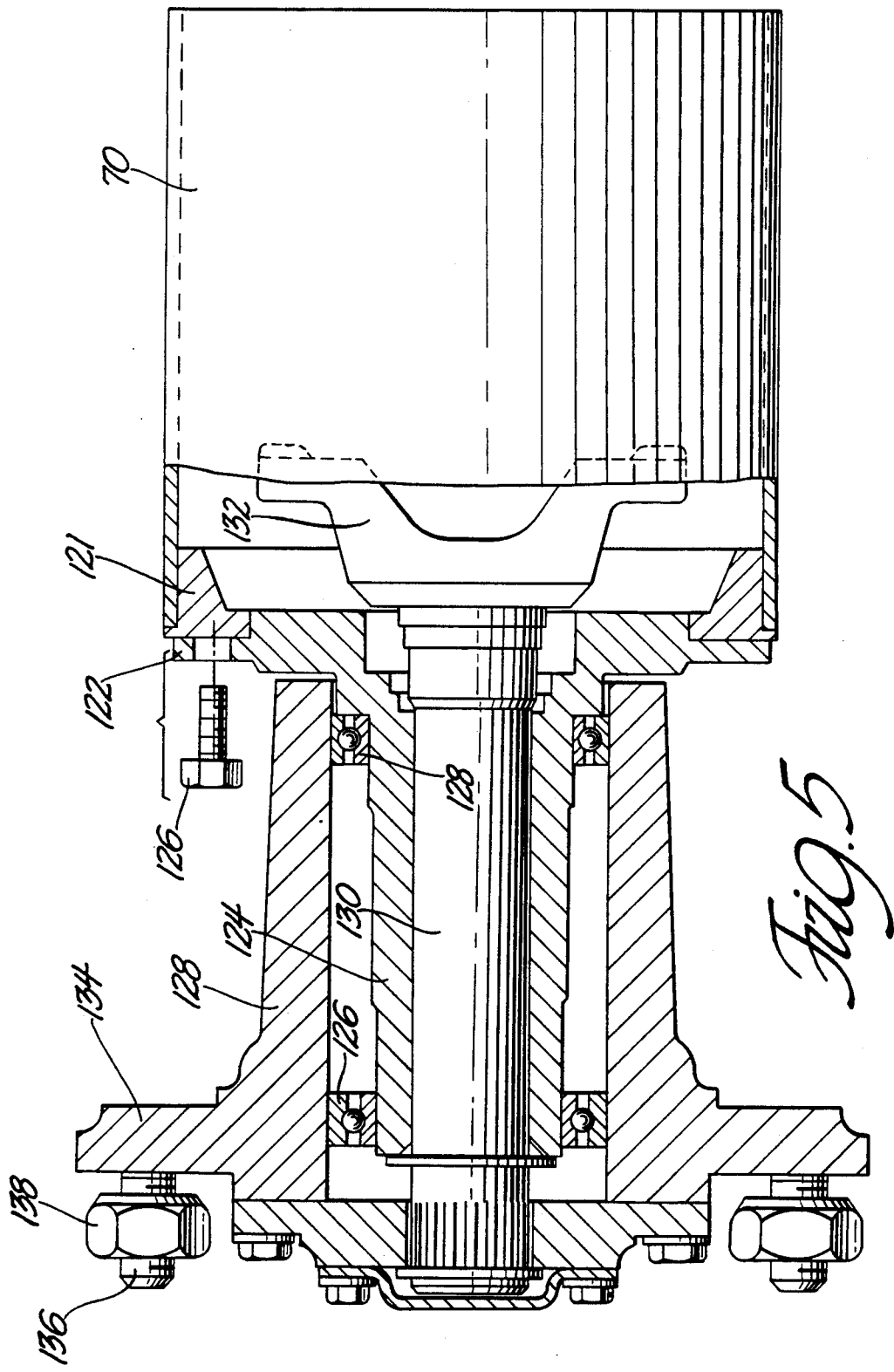
FIG. 5 is a detailed view of that portion of the wheel supporting spindle mount as indicated by the circled area 5 in FIG. 1.

With particular reference to FIGS. 1 and 2, a vehicle chassis is indicated generally at 10 and is adapted to support a vehicle body, not shown, thereupon. Chassis 10 includes a pair of longitudinal beams 12 and 14 which may be of the C-shaped configuration as shown in FIG. 3. Chassis includes a forward transverse beam 16 suitably secured, as by welding, between the longitudinal beams 12 and 14. The chassis also includes a rear transverse beam 18 disposed longitudinally rearwardly of the rear suspension indicated generally at 20.

As best seen in FIGS. 1 and 3, a differential is indicated generally at 22 and is adapted to be fixed by suitable bracketry, not shown, directly to the chassis 10 or the vehicle body structure supported upon the chassis. Thus, the differential is adapted to move vertically with the chassis and body and relative to the rear suspension 20. As with prior art devices, the mounting of the differential to the chassis or vehicle body reduces the unsprung weight of the rear suspension.

Differential 22 includes a power input shaft 24 connected through a suitable universal joint to an engine driven propeller shaft 28. The differential includes power output shafts 30 and 32 connected through suitable universal joints to live or power axles 34 and 36 which are, in turn, drivingly connected to rear wheels 38 and 40. The manner in which the live axles 34 and 36 are connected to the driving wheels will be described later in relation to FIG. 5 of the drawings.

Inboard mounted disc brakes are indicated at 41 and coact with either the differential output shafts 30 and 32 or live axles 34 and 36 to provide suitable rear wheel braking action. It is to be understood that more conventional outboard brakes located proximate wheels 38 and 40 can also be used.

The rear suspension or dead axle 20 consists of several major coacting components. As earlier suggested, the dead axle may be referred to as having a cathedral shape in which there are a first pair of longitudinally extending beam sections 42 and 44 transversely spaced outboard of the chassis beams 12 and 14. The cross sectional shape or configuration of the longitudinal beams and other associated members is most important in providing a light weight and yet extremely strong suspension construction. As particularly seen in FIGS. 3 and 4, the beam cross sections are hollow and of rectangular configuration. These shapes are to be particularly contrasted with the tubular members utilized in the aforenoted Lansden and Nallinger suspensions relative to which longitudinal bending and torsional wind up are experienced detracting from the rigidity of the suspension.

A second pair of beam sections 46 and 48 are connected to the forward ends of the longitudinal beam sections, as by butt welding, and extend forwardly and inwardly therefrom and converge in an apex joint 50 which is articulated through a trunion member 52 to chassis transverse beam 16. It is to be understood that the longitudinal beams may be fabricated of continuous members appropriately bent to provide the converging beam portions. Upper and lower plates 49 and 51 are suitably secured to beam sections 46 and 48 to reinforce apex joint 50. Trunion 52 preferably includes a heavy rubber bushing 53. The cross sectional shape of the inwardly angled beam sections 46 and 48 is the same as that of the longitudinal beam sections 42 and 44. A transverse beam 54 is secured to the respective longitudinal beam sections 42–44 and forwardly spaced from the rear ends of these sections. The cross-sectional shape of transverse beam 54 is generally the same as that of the longitudinal beam sections 42 and 44.

In order to enable the lowering of the floor height of the vehicle body supported on chassis 10, the dead axle includes a pair of identical wheel supporting spindle mounts 56 and 58 suitably supported upon the respective longitudinal beam sections 42 and 44. Inasmuch as they are identical, only one wheel supporting mount will be described. Referring most particularly to FIG. 4, spindle mount 58 is of a hollow construction and is comprised of a pair of plate members 60 and 62 secured, preferably as by welding, to the vertical inside and outside walls of the sub-adjacent longitudinal beam section 44. Each plate members, 60 and 62 projects vertically above the sub-adjacent beam section and includes an upper edge having a horizontal portion 64 and a forwardly declining portion 66 which terminates at the upper surface of the sub-adjacent beam section 48. By declining the edge portions 66 of plates 6 and 62 unnecessary material is eliminated thereby reducing the weight of the dead axle. As best seen in FIG. 3, the topmost part of spindle mount 56 extends above the bottom of chassis 10.

A pair of transversely aligned openings 68, only one of which is seen, are respectively formed in plates 60 and 62 and are adapted to receive a wheel supporting sleeve 70 which is suitably secured to the plates as by welding around the juncture between the sleeve and the plates.

In order to rigidify the wheel supporting spindle mount 58, and other axle structure, the rear end of outside plate 62 is bent at a right angle to form a triangulated section 72 which is secured as by welding, to the front vertical face of transverse beam 54. The rear end of inside plate 60 is butt welded to outside plate 62.

To further rigidify and enclose the spindle mount 58, an angled top plate member 74 is welded to the upper edge portions 64 and 66 of plates 60 and 62.

Again for the purpose of rigidifying or strengthening the light weight dead axle, a variety of reinforcing plates are provided to span the junctures between the longitudinal and angled beam sections 42-44 and 46-48 as well as with the transverse beam 54. More specifically and as seen in FIG. 4, upper and lower reinforcing plates 76 and 78 are respectively secured to the upper and lower surfaces of the adjoining longitudinal and angled beam sections 44 and 48 so as to extend across or span the juncture between such sections.

Additional reinforcing plates 80 and 82 are respectively secured to the upper and lower surfaces of the longitudinal beam section 44 and the transverse beam 54 to thereby span the juncture between this section and beam. It will be noted that the upper reinforcing plate 80 extends toward the rear of the longitudinal beam section while the underlying reinforcing plate 82 extends forwardly and is disposed sub-adjacent mounting spindle 58.

As best seen in FIGS. 1 and 2, chassis beams 12 and 14 extend rearwardly beyond the rear suspension or dead axle 20. Suitable brackets 84 and 86 are secured to the chassis beams and include portions terminating laterally above the rear ends of the longitudinal beam sections 42-44. Suitable plate members 88 are secured to the upper surface of the longitudinal beam sections proximate the rear end thereof and are adapted to support suitable spring means, such as air bags 90, thereupon. The upper end of the air bags or springs are secured to the chassis brackets 84 and 86 whereby the chassis and vehicle body are supported upon the dead axle through such spring means.

In the suspension system shown in the Manning patent 4,946,189, a conventional Panhard rod linkage is utilized to limit relative transverse or lateral movement between the dead axle and the chassis. It is found that with a Panhard type linkage or an improperly arranged Watts type linkage as the chassis moves vertically relative to the dead axle, a limited amount of relative transverse movement or rotation about the suspension roll axis occurs between the chassis and the dead axle thereby causing the latter to introduce an oversteering angle to the vehicle. In addition to an unwanted steering action, such movement imposes undesirable transverse loads on the rear tires and the chassis. By way of example, assume a 60 inch long dead axle, a 34 inch Panhard link and a 4 inch relative vertical movement between the chassis and dead axle. This results in an induced steering angle by the dead axle of 0.2 degrees which may develop a side or transverse force of 240 pounds.

Such induced oversteering angle and sideward thrust is eliminated in the present invention by the use of a three linkage mechanism shown in FIGS. 1, 2, 3 and 6 of the drawings.

Figure 6:
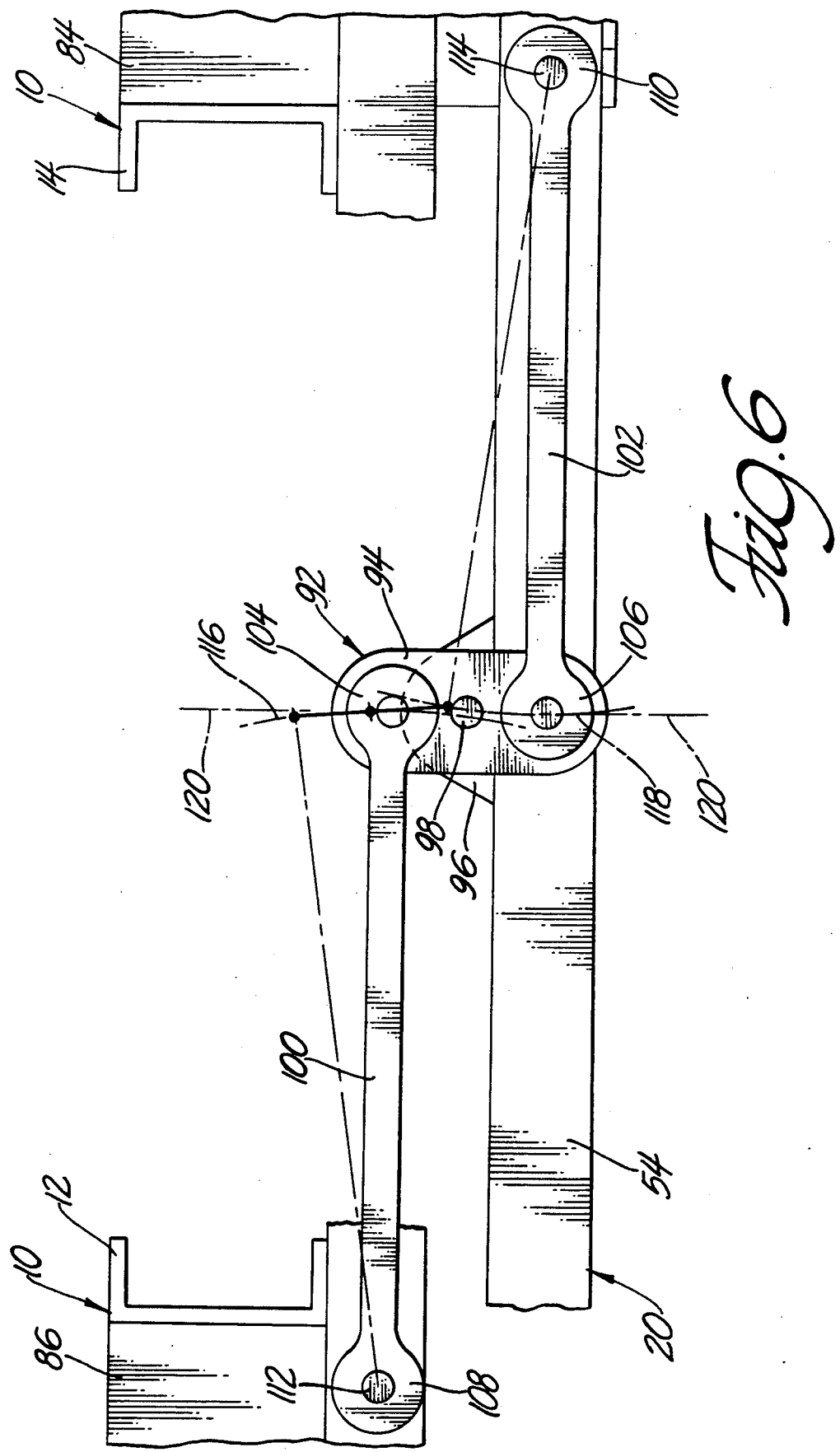
FIG. 6 is a diagrammatic representation of the three linkage mechanism as articulated between the chassis and dead axle.

The construction and operation of the three linkage mechanism, indicated generally at 92, may best be understood by particular reference to FIG. 6. A first link 94 is pivotally mounted at its midpoint to a transversely centered bracket 96 which is mounted upon transverse beam 54. Link 94 is pivotally mounted through a bracket mounted spindle 98. Equal length second and third links 100 and 102 are respectively articulated at their inner ends 104 and 106 to the first link 94 at equal distances from the bracket spindle 98 which represents the midpoint of the first link member.

Figure 7:
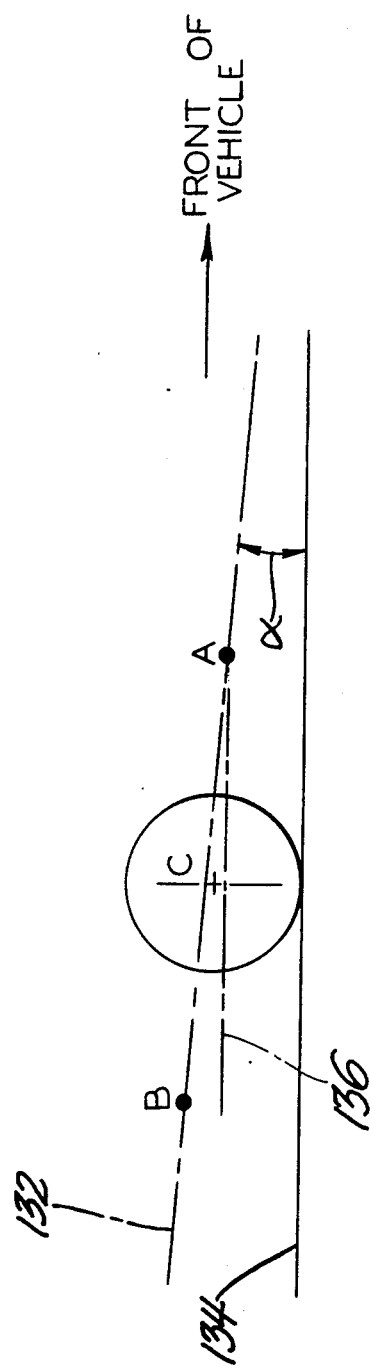
FIG. 7 is a schematic representation of the angularity of the suspension roll axis.

As best seen in FIGS. 1, 2 and 7, apex joint 50 includes a transverse axis 130 about which dead axle 30 articulates as there is relative vertical movement between the chassis and dead axle axis 130 and the point of convergence of beams 46, 48 are designated by the letter A in FIG. 7. A line between the point of convergence axis 130 and the point of convergence of beams 46, 48 are designated by the letter A in FIG. 7 of inwardly inclined beams 46, 48 passing through transverse axis 130, and spindle 98, designated by the letter B in FIG. 7, defines a longitudinal roll axis 132. It is rotation of dead axle 30 about roll axis 132 which can create an adverse steering force leading to oversteering. Such oversteering the center line between wheels 38, 40 is indicated by the letter C in FIG. 7 occurs when the longitudinal angle $\alpha$ between roll axis 132 and the horizontal 134 is negative i.e. spindle 98 is spaced vertically below transverse axis 130.

In the subject invention applicant has found that when the angle $\alpha$ is either zero or positive i.e. the roll axis 132 is either horizontal or inclined so that the axis of spindle 98 point B, is displaced vertically above a horizontal line 136 through transverse axis 130, then, oversteering is eliminated or a slight understeering occurs. It is found that slight understeering is easily accommodated by a driver whereas oversteering can be hazardous. In the present invention the angle should be in the positive range of 0-5 degrees. In other words, that portion of the roll axis 132 disposed within dead axle 20 is either horizontal or inclined above the horizontal not to exceed an angle of 5 degrees.

It is also important to note that by mounting pivot 98 on the subframe or dead axle 20, the roll axis inclination will increase as the vehicle is loaded thereby imparting more understeer with heavier loads. This is beneficial in that it provides a more conservative steering action.

FIG. 6 represents the linkage mechanism in its normal position when the chassis and dead axle are transversely aligned and there is no relative movement between the chassis and dead axle. In this position, the midpoint of link 94 and the inner ends 104 and 106 of links 100 and 102 are aligned along a generally vertical center line 120. This aligned relationship will vary during relative movement between the chassis and dead axle as will be hereinafter described.

The outer ends 108 and 110 of links 100 and 102 are respectively articulated to the chassis 10 in any suitable manner. As illustrated, outer link ends 108 and 110 are pivotally articulated to spindles 112 and 114, which are, in turn, mounted respectively upon chassis spring supporting brackets 84 and 86. Thus, the outer link ends 108 and 110 are articulated to and move With the chassis 10 while link 94 is articulated to and moves with the dead axle 20. Again, as best seen in FIG. 6, when the inner ends 104 and 106 are aligned along center line 120, links 100 and 102 are generally horizontal.

The centering action of the linkage mechanism 92 is best seen by reference to FIG. 6. As dead axle 20 moves vertically relative to chassis 10, the inner ends 104 and 106 of links 100 and 102 respectively describe arcs 116 and 118 about their respective centers represented by bracket spindles 12 and 114. Since the diversion or lateral displacement of the inner ends 104 and 106 of links 100 and 102 are equal on opposite sides of the vertical center line 120, link 94 rotates while assuring the midpoint of link 94, represented by bracket spindle 98, remains on the center line 120 during the relative vertical movement between the chassis and dead axle. Thus, the three linkage mechanism 92 assures there will be no relative lateral movement between chassis 10 and dead axle 20 even though there may be a limited rotational movement about roll axis 132.

In the illustrated embodiment as best seen in FIGS. 2 and 7, the axis of spindle 98 is vertically spaced above the horizontal plane through transverse axis 130 or, the roll axis 132 within the dead axle 30 is inclined at angle above such horizontal plane which creates a slight understeering action. The positive angle or upward slope of roll axis 132 from transverse axis rearward may be created either by raising the spindle 98 above the transverse axis 130 or lowering said axis below the spindle. In the embodiment shown, it is preferred to lower transverse axis 130 through depending trunnion bracket 52 which also provides greater vertical clearance between the suspension 30 and the superadjacent chassis 10.

Suitable shock absorbing devices 120 are provided between the dead axle and the chassis to dampen relative vertical movement therebetween.

Reference is made to FIG. 5 for a description of the manner in which wheels 38–40 are mounted upon the dead axle 20. As shown in this FIG. 5, the wheel supporting sleeve 70 includes a ring 121 welded within the outer end of the sleeve and to which a flange 122 of a journal sleeve 124 is secured through suitable stud members 126. An outer journal or hub member 128 is rotatably supported upon the inner journal 124 through suitable bearing members 126 and 128. A stub shaft 130 is connected at its inner end through a suitable connection 132 to a live axle. The outer end of the stub shaft 130 is suitably fixed to the outer journal 128 so as to permit said journal to be driven by the live axle. A radial flange 134 is provided on outer journal 128 and includes stud members 136 affixed thereto and upon which the wheels 38–40 are to be mounted by suitable nuts 138.

Other modifications are possible within the intended scope of the invention as set forth in the hereinafter appended claims.

What is claimed is:

1. A rear suspension assembly of the type including a dead axle (20) adapted to support driving wheels (38–40) outboard thereof; a vehicle body supporting chassis (10), the forward end of said dead axle having a single and transversely central joint of articulation (50) to said chassis and which joint includes a transverse axis (130) about which relative rotation between the chassis and dead axle occurs; a differential (22) mounted to said chassis and having a power input shaft (24) and a pair of output shafts (30–32), a pair of axles drivingly connected between said output shafts (34–36) and said wheels; and spring means (90) supporting said chassis upon said dead axle, said dead axle having a pair of longitudinally extending beam means (42, 44, 46, 48) disposed on laterally opposite sides of the differential and having inwardly inclined forward sections (46, 48) forming the joint of articulation to said chassis, a transverse beam (54) integrally connecting the longitudinal beam means rearward of said wheels, and a mechanism (92) for limiting relative lateral movement between the dead axle and the chassis, the improvement comprising:

said mechanism (92) having
A. a first link member (94) pivotally supported at its midpoint through a spindle (98) upon said transverse beam;
B. a dead axle roll axis (132) extending between the spindle and the transverse axis (130) of the joint of articulation, the roll axis rearward of the transverse axis being coincident with or upwardly inclined above a horizontal line (136) extending through the transverse axis;
C. second and third link members (100 and 102) articulated at their respective inner ends (104, 106) to said first link member at points equidistant from said midpoint;
D. said second and third link members having outer ends (108, 110) respectively articulated to laterally opposite sides of said chassis whereby said first, second and third link members coact to prevent lateral movement of said dead axle relative to said chassis when the dead axle moves vertically relative to the chassis while permitting dead axle rotation about said roll axis.

2. A rear suspension assembly of the type set forth in claim 1 wherein the spindle (98) is spaced vertically above said transverse beam (54).

3. A rear suspension assembly of the type set forth in claim 1 wherein the roll axis rearward of the transverse axis (130) defines an angle of 0–5 degrees relative to said horizontal line (136).

4. A rear suspension assembly of the type set forth in claim 1 wherein said transverse beam (54) includes a laterally centered first bracket (96), said first link member (94) being pivotally mounted at its midpoint upon a spindle (98) fixed to said bracket, second and third brackets (84, 86) fixed to opposite sides (12, 14) of the chassis, the outer ends (108, 110) of the second and third link members being articulated respectively to said second and third brackets.

5. A rear suspension assembly of the type set forth in claim 4 wherein a substantially vertical centerline (120) extends through the first bracket spindle (98), the inner ends (104,106) of link members (100, 102) being aligned along said centerline and on vertically opposite sides of the bracket spindle (98) when there is no relative movement between the chassis and dead axle.

* * * * *